(12) United States Patent
Rubino

(10) Patent No.: US 11,913,520 B2
(45) Date of Patent: Feb. 27, 2024

(54) FALSE TOOTH FOR TOOTHED BELTS, SEMI-FINISHED WORKPIECE, TOOTHED BELT AND METHOD

(71) Applicant: VISION TECH S.R.L., Calderara di Reno (IT)

(72) Inventor: Attilio Rubino, Anzola Emilia (IT)

(73) Assignee: Vision Tech S.R.L (IT)

( * ) Notice: Subject to any disclaimer, the term of this patent is extended or adjusted under 35 U.S.C. 154(b) by 78 days.

(21) Appl. No.: 17/785,774

(22) PCT Filed: Dec. 18, 2020

(86) PCT No.: PCT/IB2020/062167
§ 371 (c)(1),
(2) Date: Jun. 15, 2022

(87) PCT Pub. No.: WO2021/124235
PCT Pub. Date: Jun. 24, 2021

(65) Prior Publication Data
US 2023/0107115 A1   Apr. 6, 2023

(30) Foreign Application Priority Data
Dec. 18, 2019  (IT) .......................... 102019000024358

(51) Int. Cl.
*F16G 1/28*   (2006.01)
*B65G 15/42*  (2006.01)

(52) U.S. Cl.
CPC ............... *F16G 1/28* (2013.01); *B65G 15/42* (2013.01)

(58) Field of Classification Search
CPC ..... F16G 1/28; F16G 3/00; F16G 5/20; F16G 5/06; F16G 1/12; F16H 7/023
USPC ......................................... 474/204, 205, 218
See application file for complete search history.

(56) References Cited

U.S. PATENT DOCUMENTS

| | | | | |
|---|---|---|---|---|
| 366,472 A | * | 7/1887 | Garland | .................. F16H 7/023 |
| | | | | 305/40 |
| 366,473 A | * | 7/1887 | Garland | .................... F16G 1/28 |
| | | | | 474/204 |
| 1,634,033 A | * | 6/1927 | Lewellen | .................. F16G 3/00 |
| | | | | 24/37 |

(Continued)

FOREIGN PATENT DOCUMENTS

| | | |
|---|---|---|
| JP | S6084439 A | 5/1985 |
| WO | WO 2009/040628 A1 | 4/2009 |

*Primary Examiner* — Henry Y Liu
(74) *Attorney, Agent, or Firm* — Endurance Law Group PLC

(57) ABSTRACT

Two embodiments of a false tooth limit the damage to a toothed belt and of a bearing layer of a base of the toothed belt, which in general comprises cables or textiles. The false tooth comprises a longitudinal bar and a bushing which extends transversally from the longitudinal bar. In the first embodiment the longitudinal bar is tapered towards a free end of the bushing while in the second embodiment the longitudinal bar is profiled, i.e., has a flank for contacting the toothed belt which is convex towards the outside when viewed in transversal section. The false teeth are advantageously applied on toothed belts comprising grooves which cut the teeth, enabling a reduction of the thickness of the tooth during the winding. A method and a semi-finished workpiece are also disclosed.

18 Claims, 12 Drawing Sheets

(56) References Cited

U.S. PATENT DOCUMENTS

| | | | | |
|---|---|---|---|---|
| 1,634,034 A * | 6/1927 | Lewellen | ............... | F16G 3/00 |
| | | | | 76/78.1 |
| 1,982,869 A * | 12/1934 | Heyer | ............... | B29D 29/106 |
| | | | | 474/265 |
| 2,338,550 A * | 1/1944 | Sloman | ............... | B62D 55/205 |
| | | | | 474/204 |
| 3,105,390 A * | 10/1963 | Wiese | ............... | B65G 15/42 |
| | | | | 24/31 W |
| 3,558,198 A * | 1/1971 | Tomita | ............... | B62D 55/286 |
| | | | | 305/180 |
| 3,690,741 A * | 9/1972 | Pierson | ............... | B62M 27/02 |
| | | | | 474/204 |
| 3,694,040 A * | 9/1972 | Hallaman | ............... | B62D 55/24 |
| | | | | 305/179 |
| 3,772,929 A * | 11/1973 | Redmond, Jr. | ............... | B32B 25/12 |
| | | | | 474/205 |
| 3,944,006 A * | 3/1976 | Lassanske | ............... | B62D 55/202 |
| | | | | 180/9.62 |
| 4,053,547 A * | 10/1977 | Redmond, Jr. | ............... | F16G 5/20 |
| | | | | 156/137 |
| 4,230,029 A * | 10/1980 | Schott, Jr. | ............... | B29C 66/80 |
| | | | | 83/831 |
| 4,298,343 A * | 11/1981 | Redmond, Jr. | ............... | F16G 3/02 |
| | | | | 24/38 |
| 4,493,681 A * | 1/1985 | Takano | ............... | F16G 5/20 |
| | | | | 474/250 |
| 4,705,469 A * | 11/1987 | Liebl | ............... | F16H 7/023 |
| | | | | 425/408 |
| 4,741,726 A * | 5/1988 | Zarife | ............... | F16G 5/20 |
| | | | | 474/268 |
| 4,781,658 A * | 11/1988 | Takano | ............... | F16H 57/0489 |
| | | | | 474/205 |
| 4,799,919 A * | 1/1989 | Kozachevsky | ............... | F16G 1/28 |
| | | | | 474/205 |
| 4,842,571 A * | 6/1989 | Liebl | ............... | B29D 29/085 |
| | | | | 474/204 |
| 4,846,771 A * | 7/1989 | Kozachevsky | ............... | F16G 1/28 |
| | | | | 474/205 |
| 4,861,323 A * | 8/1989 | Kobayashi | ............... | F16G 1/16 |
| | | | | 474/260 |
| 4,934,992 A * | 6/1990 | Simon | ............... | F16G 5/20 |
| | | | | 474/268 |
| 4,994,000 A * | 2/1991 | Simon | ............... | F16G 5/06 |
| | | | | 474/268 |
| 5,482,364 A * | 1/1996 | Edwards | ............... | B62D 55/096 |
| | | | | 305/157 |
| 6,485,386 B2 * | 11/2002 | Yuan | ............... | F16G 1/28 |
| | | | | 474/205 |
| 9,004,618 B1 * | 4/2015 | Delisle | ............... | B62D 55/32 |
| | | | | 305/180 |
| 9,511,805 B2 * | 12/2016 | Lajoie | ............... | B62D 55/244 |
| 10,933,877 B2 * | 3/2021 | Lussier | ............... | B62D 55/12 |
| 2001/0044354 A1 * | 11/2001 | Yuan | ............... | B29D 29/08 |
| | | | | 474/263 |
| 2003/0173192 A1 * | 9/2003 | Kolling | ............... | B29D 29/08 |
| | | | | 425/34.2 |
| 2004/0147351 A1 * | 7/2004 | Zona | ............... | F16G 1/12 |
| | | | | 474/205 |
| 2008/0110727 A1 * | 5/2008 | Fandella | ............... | F16G 1/28 |
| | | | | 198/844.2 |
| 2010/0025200 A1 * | 2/2010 | Fandella | ............... | F16G 3/02 |
| | | | | 198/850 |
| 2018/0149233 A1 * | 5/2018 | Huels | ............... | B65G 15/36 |

* cited by examiner

Prior art

FALSE TOOTH FOR TOOTHED BELTS, SEMI-FINISHED WORKPIECE, TOOTHED BELT AND METHOD

TECHNICAL FIELD

The present invention relates to the technical sector concerning transfer of drive with flexible transmission means provided with cogging. More in detail, the invention relates to false teeth and is especially useful for applications of synchronous/asynchronous transport of articles or products.

PRIOR ART

In the following text, the term toothed belt relates to a generic flexible transmission means comprising one or more coggings for engaging corresponding toothed pulleys, cogged rollers or other like devices, independently of the fact that this means can be described as a belt as in WO 2010/015919 A2, a belt as in WO 2008/125966 A1 or a piece thereof.

Toothed belts comprise a base and a cogging which is on the base and which comprises a plurality of teeth appropriately configured to couple to another toothed device; the belts are usually completed by further elements or operations, for example seats for articles, in consideration of the use for which they are destined.

The false teeth are abutments applied to the side of the base that is provided with cogging to secure an element to the base, on the opposite side to the toothed side. The false teeth comprise a longitudinal bar and at least one bushing for engaging a through-hole which crosses the base of the toothed belt, as schematically illustrated in FIG. 1. FIG. 1 illustrates the base (B) of a toothed belt, with the steel strands highlighted, crushed between an element (C) located above the base (B) and a false tooth (A) located below the base (B). The false tooth (A) comprises a threaded through-hole which crosses the bushing while the element (C) has a through-hole which also defines a seat for the bushing of the false tooth (A). The bushing of the false tooth (A) crosses a through-hole of the base, enabling a threaded screw (D) to engage it. The head of the threaded screw (D) abuts against a seat fashioned on the element (C) so that it nears the element (C) to the false tooth (A) while it enmeshes the threading of the false tooth (A). The threaded screw (D) secures the element to the base (B) and enables calibration of the distance between the false tooth (A) and the element (C) by making the connection more or less stable. With the use of a demountable connection, such as for example the threaded connection just described, the element (C) can be adjusted and/or replaced and/or shifted a plurality of times. The demountable connections are therefore in general preferred for the operative flexibility thereof but the false tooth (A) and the element (C) might also be connected by fixed connections, for example be glued to one another.

In WO 2010/015919 A2 the false teeth are used to join two ends of a toothed belt by blocking the ends between an element and a false tooth. The connected element can have numerous functions; for example, in product transport applications the element can be a carrier, a bracket, a batten or a block. The false teeth advantageously enable making the toothed belt appropriate for the process underway, for example by enabling a rapid format change.

In general the false teeth are applied after the coggings are already formed and for this reason, as described in WO 2010/015919 A2, the method for realising the toothed belt comprises following steps:

totally remove a tooth of a cogging of a toothed belt so as to form a smoothed area which extends parallel to the other teeth of the cogging;

realise a through-hole, which crosses the base of the toothed belt at the location of the smoothed area;

position a false tooth in contact with the smoothed area so that the bushing engages the through-hole.

In a widely-practised method, the section of the false tooth has a shape and dimension alike that of the tooth that has been removed, although usually it is smaller to prevent interference with the winding of the pulleys and/or noises determined by contact between false tooth and pulleys which are usually both made of a metal material.

A false tooth in the shape of a tooth requires at least two bushings which prevent rotation thereof with respect to an axis parallel to that of the hole. The holes are in any case stressed and tend to become oval, thus enabling displacements which can compromise the performance and functionalities of the toothed belt.

In some prior art solutions, in combination or not with the presence of a plurality of bushings, the rotation of the false tooth is prevented by removing only a central portion of the tooth so as to give rise to two walls that act as abutments for the false tooth. The longitudinal bar of the false tooth preferably has a transversal section having a quadrilateral shape, so as to be more stable between the two walls as they front two flanks on opposite sides of the longitudinal bar, preventing or reducing to a minimum the movement, as well as the rotation or ovalisation of the through-holes.

Both the above solutions described are illustrated in FIG. 2 which shows a toothed belt in which the following are visible, going from the left, a complete tooth (E), un false tooth (A) located at the position of a missing tooth and a tooth (E) provided with a groove engaged by a false tooth (A).

As illustrated in the figures of GB 2116287 A, the base of the toothed belts normally comprises reinforcing means which form a bearing layer, such as for example cables or textiles. As can be observed from FIG. 2 and as described to this point, the false teeth are located in proximity of the bearing layer and are generally more rigid than the cogged profile they replace; it follows that the false teeth can compromise the integrity and working life of the bearing layer. These effects are more evident the more the winding diameter, for example of the pulley, reduces: the false teeth give rise to rigid discontinuities that limit the flexibility of the toothed belt and which stress it, for example in proximity of a longitudinal edge or in the portion between the two longitudinal edges of the longitudinal bar which face on the base. Further, the drawbacks become more marked the more the element is secured to the base, with the false tooth compressing it to a greater degree.

The toothed belts can comprise grooves that cleave the tooth and locally increase the flexibility thereof, enabling the crushing during the winding, for example to enable winding small diameters. In fact a solution of this type enables reducing the thickness of the tooth during the winding: when the flanks of the teeth (E) of the toothed belt of FIG. 3 are subjected to compression, the volume of the grooves reduces and thus the base (B) can rotate on smaller diameters. In like applications the difference between the flexibility of the toothed belt and the rigidity of the false tooth becomes still more evident, with a consequent greater risk of damage. In fact while the walls of the cogs near one another in proximity of the cogging of the pulley, the flanks of the longitudinal bar of the false tooth remain at the same distance. We add that the thickness between the tooth and the bearing layer, also known as the nose, generally diminishes with the reduction of the winding diameter.

The reduction of the winding diameters is particularly relevant in the applications for transport of products as it enables reducing the sizes of the equipment, as well as the masses and costs, without compromising the functionality thereof. By way of indication, for a metric pitch 10, the market today demands winding diameters that are significantly lower than 50 millimetres, and even around 10 millimetres.

SUMMARY OF THE INVENTION

The present invention obviates the above-described drawbacks by reducing the stresses on the bearing layer of the base of the toothed belt and thus ensuring longer working life and a lower risk of breakage; especially in belts having teeth provided with grooves and/or in the winding of small diameters, for example lower than 50 millimetres or even than 15 millimetres for metric pitches of 10 millimetres.

These and other aims, which will be obvious to the expert in the sector from a reading of the following text, are attained by means of false teeth according to claims 1 and 5, of a toothed belt according to claim 7, of a method according to claim 13 of a semi-finished workpiece according to claim 14.

The above-described technical problem is obviated by a first embodiment and by a second embodiment of a false tooth, each of which has further advantageous characteristics with respect to the solutions in the prior art.

The first embodiment of the false tooth comprises a longitudinal bar that is tapered towards the free end of the bushing.

The second embodiment of the false tooth comprises a longitudinal bar which is profiled, i.e. has a flank for contacting the toothed belt which is convex towards the outside when viewed in transversal section.

Both the first and the second embodiment reduce the stresses on the base of the toothed belt and, in particular, on the bearing layer.

Both the first and the second embodiment are usefully advantageously exploited in a toothed belt which comprises a plurality of grooves, a groove for each tooth which comprises a first wall and a second wall, which delimit the groove and define a respective flank of the tooth. A like toothed belt also enables implementation of a method for securing an element to the base with the use of a false tooth which does not require the prior milling of a tooth, as instead happens in the prior art solution illustrated in FIG. 2.

Often the longitudinal bar of the false tooth extends from an edge to the other of the base of the toothed belt or of the cogging and generally the length of the longitudinal bar depends on the dimensions of the toothed belt. The complications deriving from the proliferation of false teeth with different lengths are obviated with the introduction of a semi-finished workpiece which comprises a plurality of false teeth arranged in a row and interposed between cuts so that the semi-finished workpiece can be cut according to needs, giving rise to a false tooth of an appropriate length.

BRIEF DESCRIPTION OF THE DRAWINGS

Specific embodiments of the invention, and the advantages thereof, will be described in the following part of the present description, according to what is set down in the claims and with the aid of the accompanying tables of drawings, in which:

DESCRIPTION OF THE PREFERRED EMBODIMENTS

Figure 1:
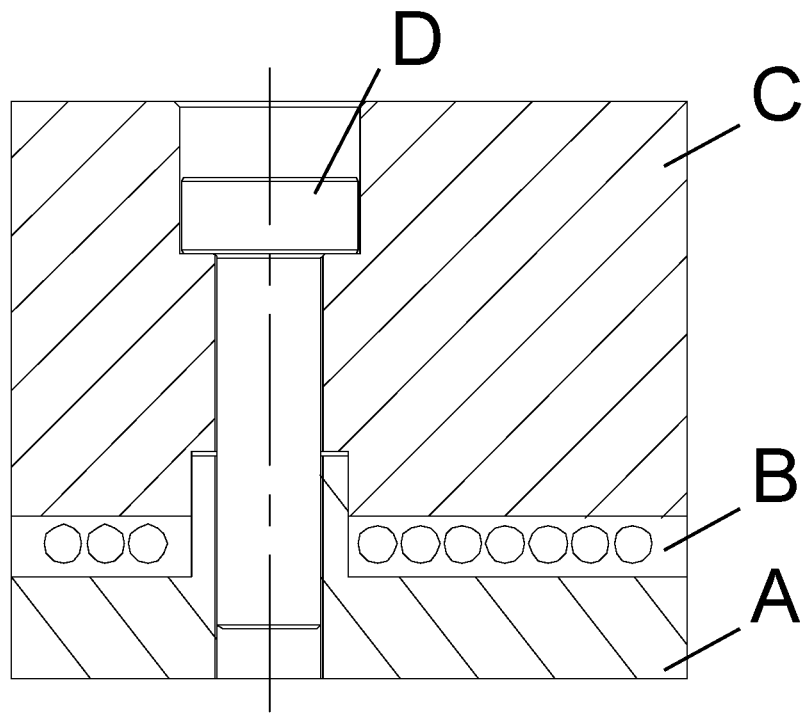
FIG. 1 is a section view of a toothed belt of known type, complete with a false tooth and an accessory element, the plane passing through the axis of the through-hole in the base of the toothed belt and being parallel to the extension of the longitudinal bar of the false tooth.
Figure 2:
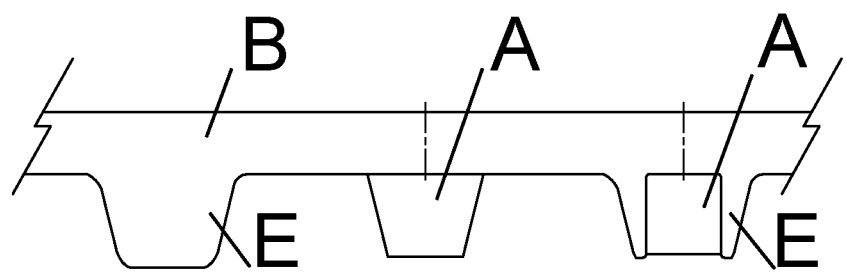
FIG. 2 is a lateral view of a toothed belt which has false teeth of known type.
Figure 3:
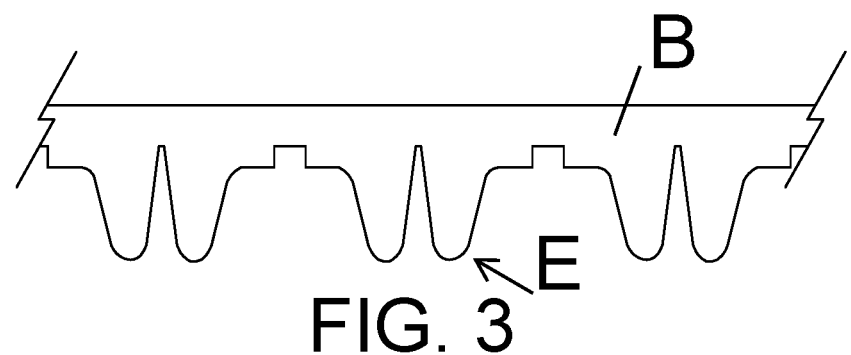
FIG. 3 is a lateral view of a toothed belt of known type.
Figure 4:
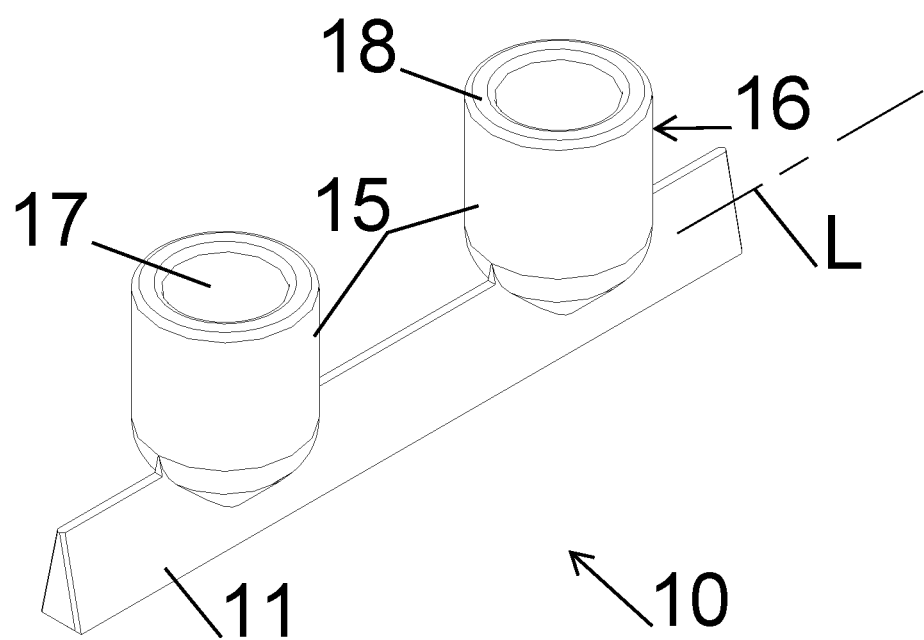
FIG. 4 is an axonometric view of a false tooth according to a first embodiment thereof.

With reference to the appended figures of the drawings, the false tooth for toothed belts of the present invention has a first embodiment which is denoted by reference numeral 10 and a second embodiment which is denoted by reference numeral 100. In both embodiments the false tooth (10, 100) comprises a longitudinal bar (11, 111) and a bushing (15, 115), preferably a plurality of bushings (15, 115). FIG. 4 illustrates a straight line (L) arranged along the longitudinal direction. Each bushing (15, 115) is solidly constrained to the longitudinal bar (11, 111), extends transversally from the longitudinal bar (11, 111) and is configured to engage a through-hole crossing the base (2) of the toothed belt (1). Generally the through-holes on the toothed belts have a circular section and preferably the lateral surface (16, 116) of the bushing (15, 115) is at least partially cylindrical to match the through-hole it engages. The bushing (15, 115) is preferably configured so that the free end (18, 118) projects with respect to the through-hole. In the case of a plurality of bushings (15, 115) they must face on a same side of the longitudinal bar (11, 111), preferably extending along parallel axes to one another.

In general the bushing (15, 115) comprises a hole (17, 117) which is preferably threaded to engage with a screw (5). The hole (17, 117) of the bushing, as well as the threading, can also affect or cross the longitudinal bar (11, 111).

In the first embodiment of the false tooth (10) the longitudinal bar (11) is conformed such as to engage a groove (6) of a toothed belt (1) which communicates with a through-hole and which comprises a first flank (12) and a second flank (13), both the first flank (12) and the second flank (13) extending longitudinally on opposite sides of the longitudinal bar (11) and being configured to contact respectively a first wall (31) and a second wall (32) which delimit the groove (6). The bushing (15) extends transversally from the first flank (12) and the second flank (13). The longitudinal bar (11) is tapered towards the free end (18) of the bushing (15), the width of the longitudinal bar (11) between the first flank (12) and the second flank (13) diminishing towards the free end (18) of the bushing (15).

The false tooth (10) of the first embodiment can advantageously be applied on a groove (6) of a toothed belt (1) which is made on a first tooth (30) of a cogging (3) and which is in communication with a through-hole, which crosses the base (2) of the toothed belt (1). The first tooth (30) thus comprises a first wall (31) and a second wall (32), defining, on one side, a respective flank (33, 34) of the first tooth (30) and on the other side delimiting, at least partly, the groove (6). The first wall (31) and the second wall (32) partially delimit the groove (6) when the groove also affects the base (2) of the toothed belt (1), in general terminating before the bearing layer (21); in this case the groove (6) is delimited by the first wall (31), the base (2) of the toothed belt (1) and the second wall (32).

Owing to the false tooth (10) according to the first embodiment, two walls of the first tooth (30) are between the longitudinal bar (11) and the base (2) of the toothed belt (1) which limit the negative effects on the bearing layer (21) of the base (2) of the toothed belt (1), due to the rigidity of the false tooth (10). The reduced width of the longitudinal bar (11) in proximity of the base (2) of the toothed belt (1) enables the belt to flex to wind about a pulley, without the limitations set by the rigidity and extension in width of the false teeth of traditional type. Further, when the false tooth (10) is connected to an element (4) and stretches on the base (2) of the toothed belt (1), the first wall (31) and the second wall (32) of the first tooth (30) also pose resistance, being able for example to deform, due to the contact with the first flank (12) and the second flank (13).

This effect is more evident should both the first flank (12) and the second flank (13) be configured to contact, with all of the surface thereof, respectively the first wall (31) and the second wall (32).

Though the longitudinal bar (11) can comprise a third flank (14) which extends transversally between the first flank (12) and the second flank (13), the longitudinal bar (11) is preferably V-shaped or U-shaped, when seen in transversal section, with the first flank (12) and the second flank (13) defining a respective rod of the V or of the U. The rods are the portions that extend from the point of the V from the arc of the U. These preferred embodiments further reduce the width of the longitudinal bar (11) in proximity of the base (2) and consequently increase the flexibility of the toothed belt (1) once it is provided with the false tooth (10) and reduce the stresses on the bearing layer (21).

Figure 5:
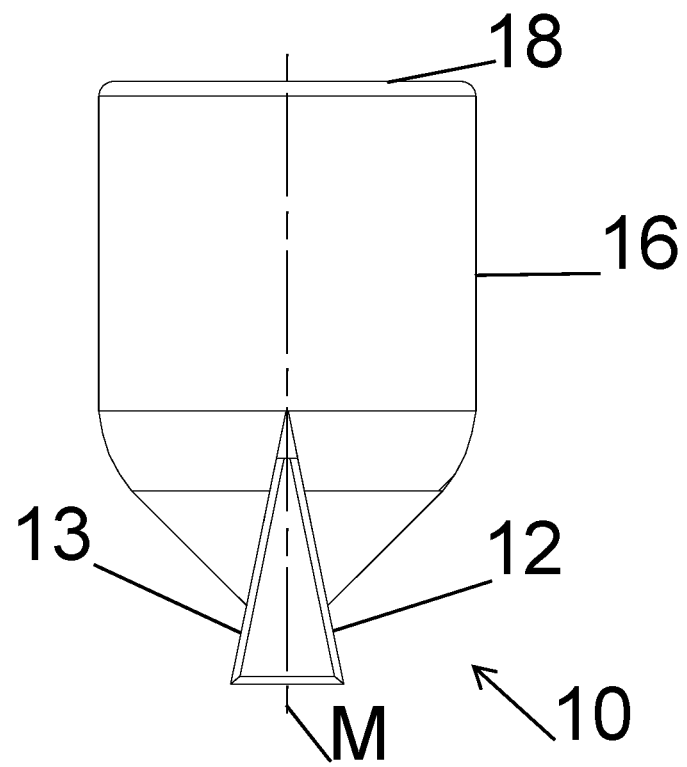
FIG. 5 is a lateral view of the false tooth of FIG. 4.
Figure 6:
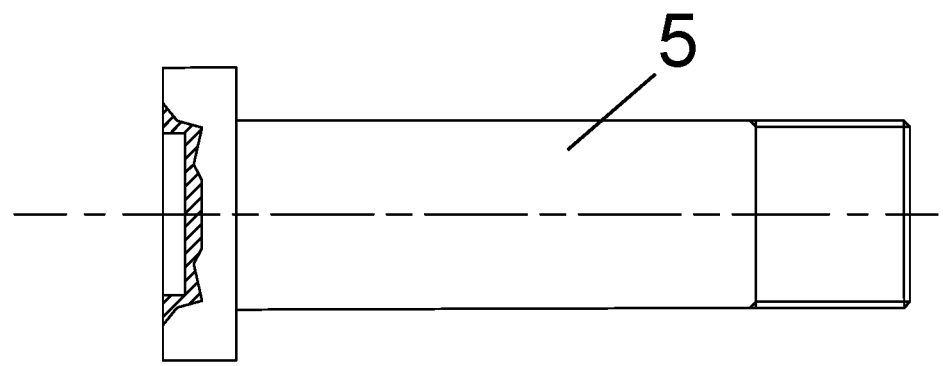
FIG. 6 is a lateral view, complete with a partial section, of a screw suitable for joining a false tooth to an element.
Figure 7:
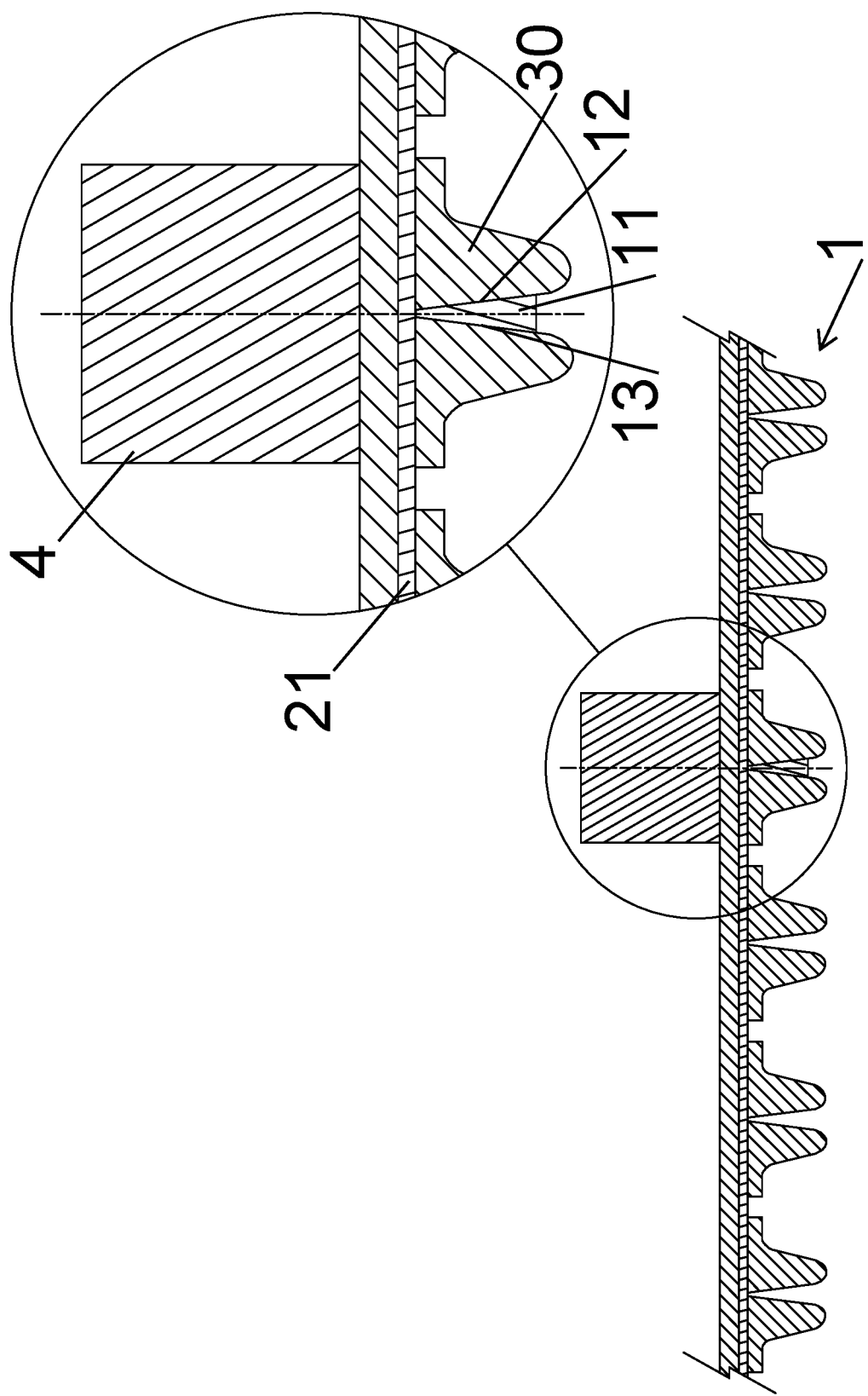
FIG. 7 is a section view, with a detail, of a toothed belt complete with the element and false tooth according to a first embodiment thereof.
Figure 8:
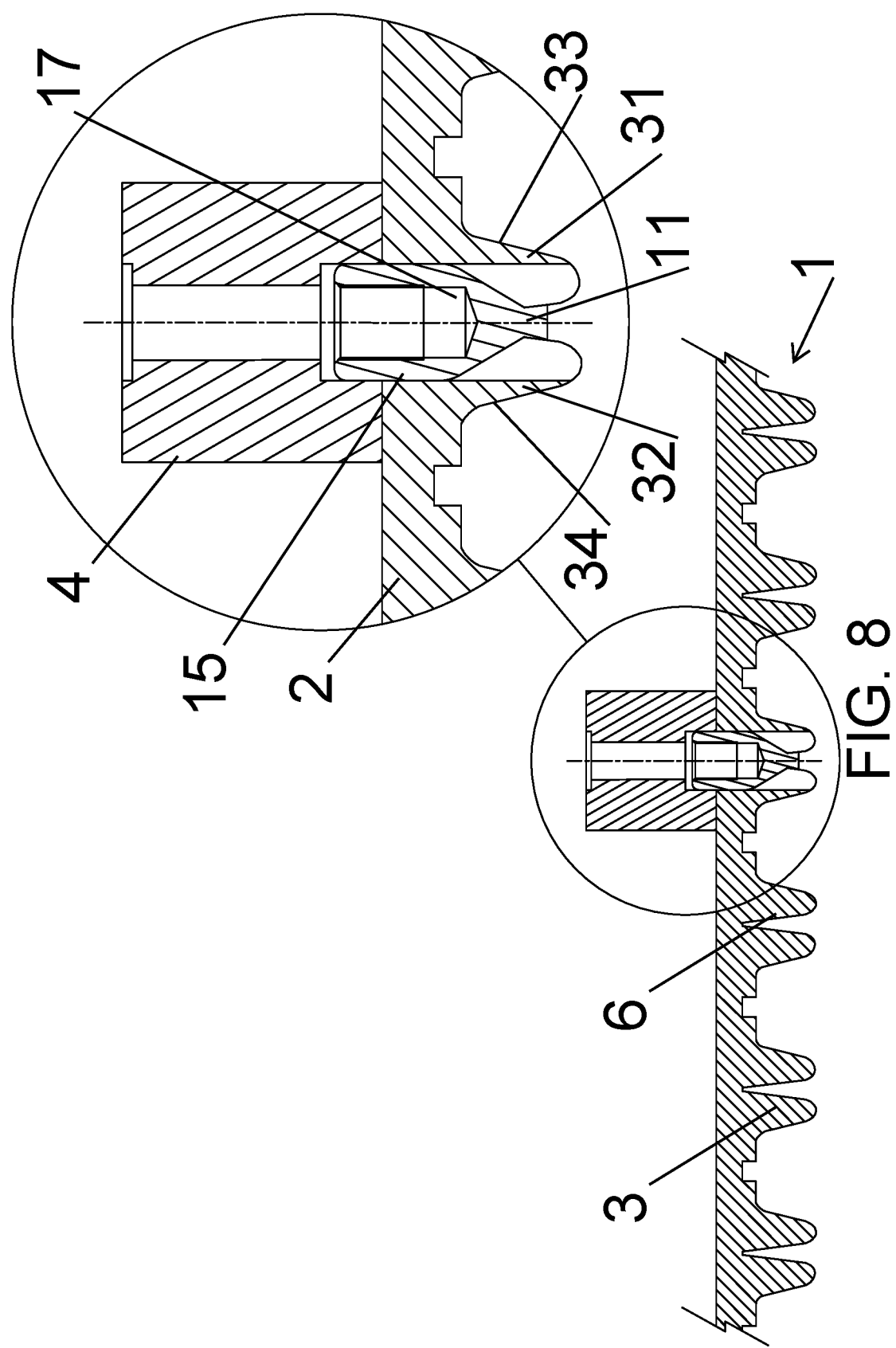
FIG. 8 is a section view, with a detail, of the toothed belt of FIG. 7 with a plane passing through the axis of the through-hole in the base of the toothed belt.
Figure 9:
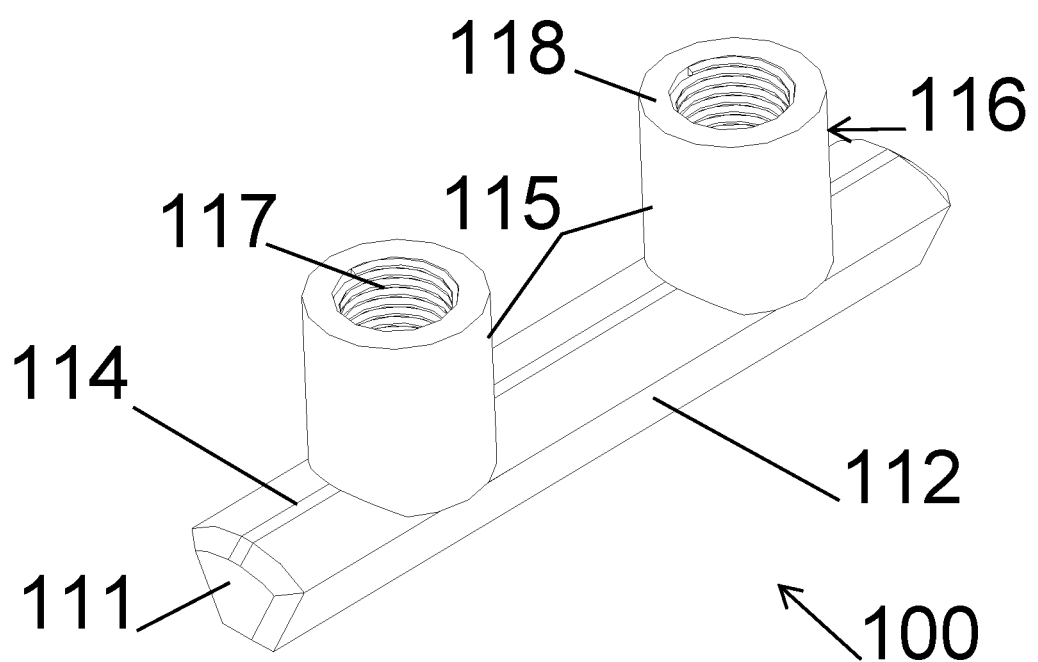
FIG. 9 is an axonometric view of a false tooth according to a second embodiment thereof.

As shown in FIG. 5, the first flank (12) and the second flank (13) are preferably symmetrical with respect to a median plane (M) and the bushing (15) is axial-symmetrical with respect to an axis lying on the median plane (M). In this way different behaviours between one side and the other of the longitudinal bar (11) are avoided, which might give rise to point stresses of greater intensity.

The false tooth (10) illustrated in FIG. 5 has both the first flank (12) and the second flank (13) both flat, with the respective planes tangential and defining an acute angle towards the longitudinal bar (11). In general, the angle is lower than 45 sexagesimal degrees, is preferably lower than 30 sexagesimal degrees and very preferably is lower than 25 sexagesimal degrees. Further, the longitudinal bar (11) defines a V when seen in transversal section and has a fourth flank, also flat.

In the second embodiment of the false tooth (100) the longitudinal bar (111) comprises a first flank (112), a second flank (113) and, between the first and second flanks (112, 113), a third flank (114), both the first flank (112) and the second flank (113) extending longitudinally on opposite sides of the longitudinal bar (111) and the third flank (114) extending longitudinally and being configured to contact the toothed belt (1). The bushing (115) extends transversally from the third flank (114) in order to engage a through-hole of the toothed belt (1). The third flank (114) is advantageously concave towards the first flank (112) and the second flank (113), when seen in transversal section.

In the second embodiment the profile of the longitudinal bar (111) enables the base (2) of the toothed belt (1) to flex to wind about a pulley, without the limitations of the false teeth of traditional type, as the longitudinal bar (111) follows, or tends to follow, the advancement assumed by the base (2) of the toothed belt (1) during the winding. The portions of material interposed between the element (4) and the false tooth (100) can take on conformations which do not limit, or limit only minimally, the winding of the toothed belt (1). The portions of material can belong to the base (2) and/or to the cogging (3) of the toothed belt (1), in accordance with how the housing (7) is conformed. For example, on an already-formed toothed belt (1) the seat (7) of the false tooth (100) can be made by milling of a first tooth (30): the milling can completely or partly remove the first tooth (30).

Further, the shape of the longitudinal bar (111) reduces the risk or prevents the rotation of the false tooth (100), even in the case of contact with a flat seat (7). In fact by stretching the base (2) between the false tooth (100) and the element (4), the third flank (114) tends to get wedged and the convexity gives rise to contact zones that oppose the rotation.

The particular shape also enables coupling with an appropriate seat (7) on the base (2) and/or on the cogging (3) of the toothed belt (1) with the advantages described in the following.

Figure 10:
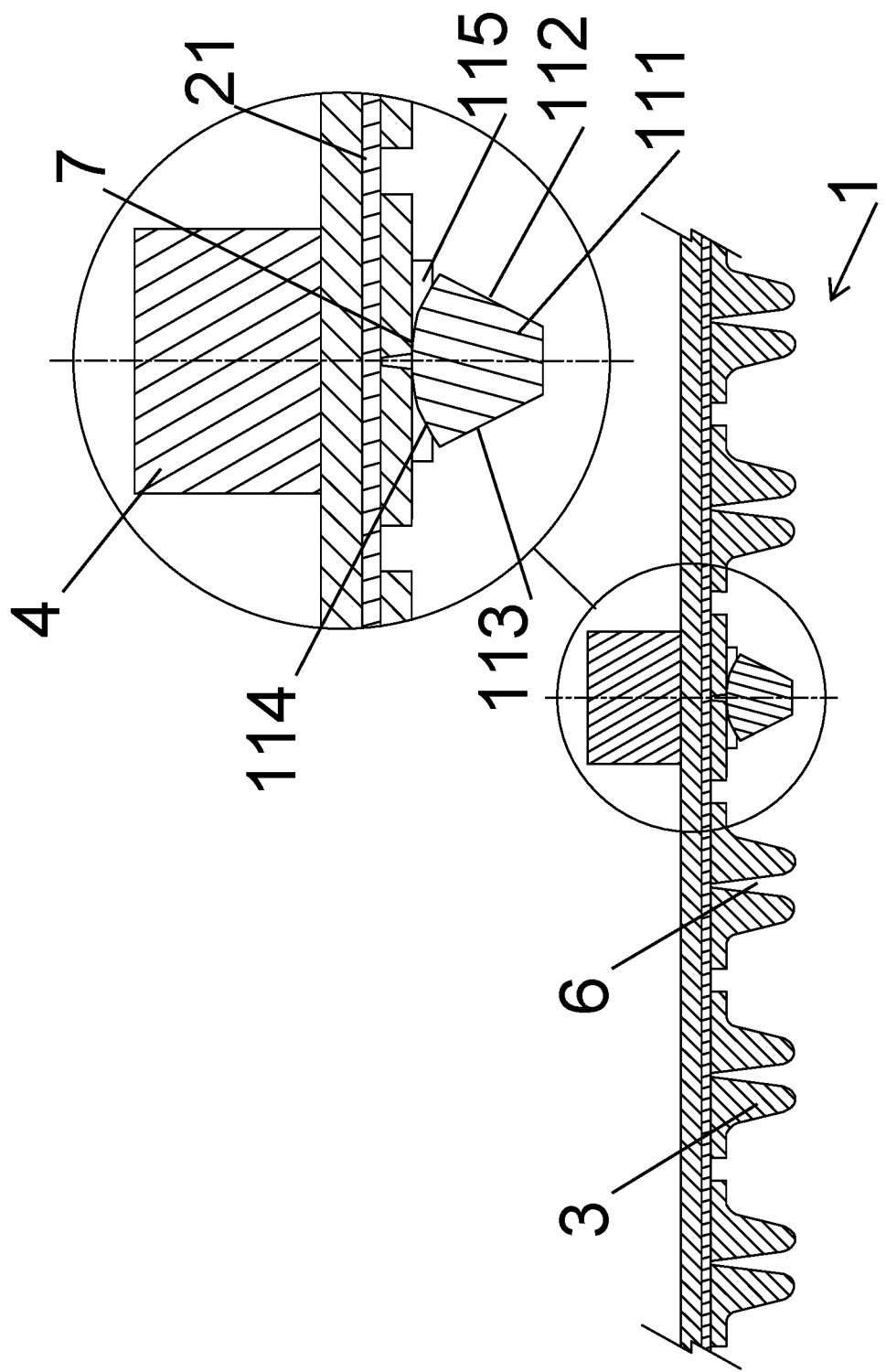
FIG. 10 is a section view, with a detail, of a toothed belt complete with the element and false tooth according to a second embodiment.
Figure 11:
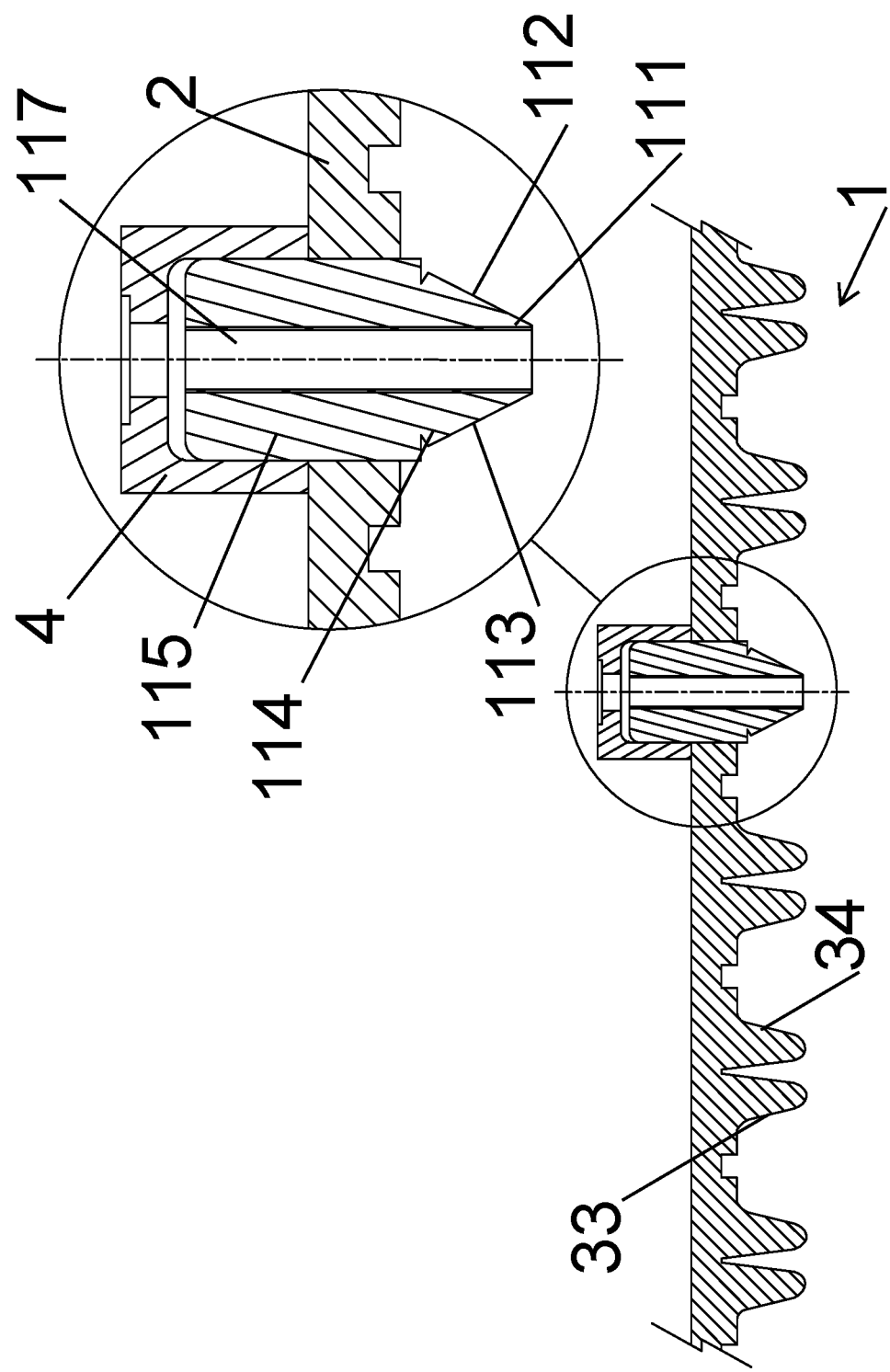
FIG. 11 is a section view, with a detail, of the toothed belt of FIG. 10 with a plane passing through the axis of the through-hole in the base of the toothed belt.
Figure 12:
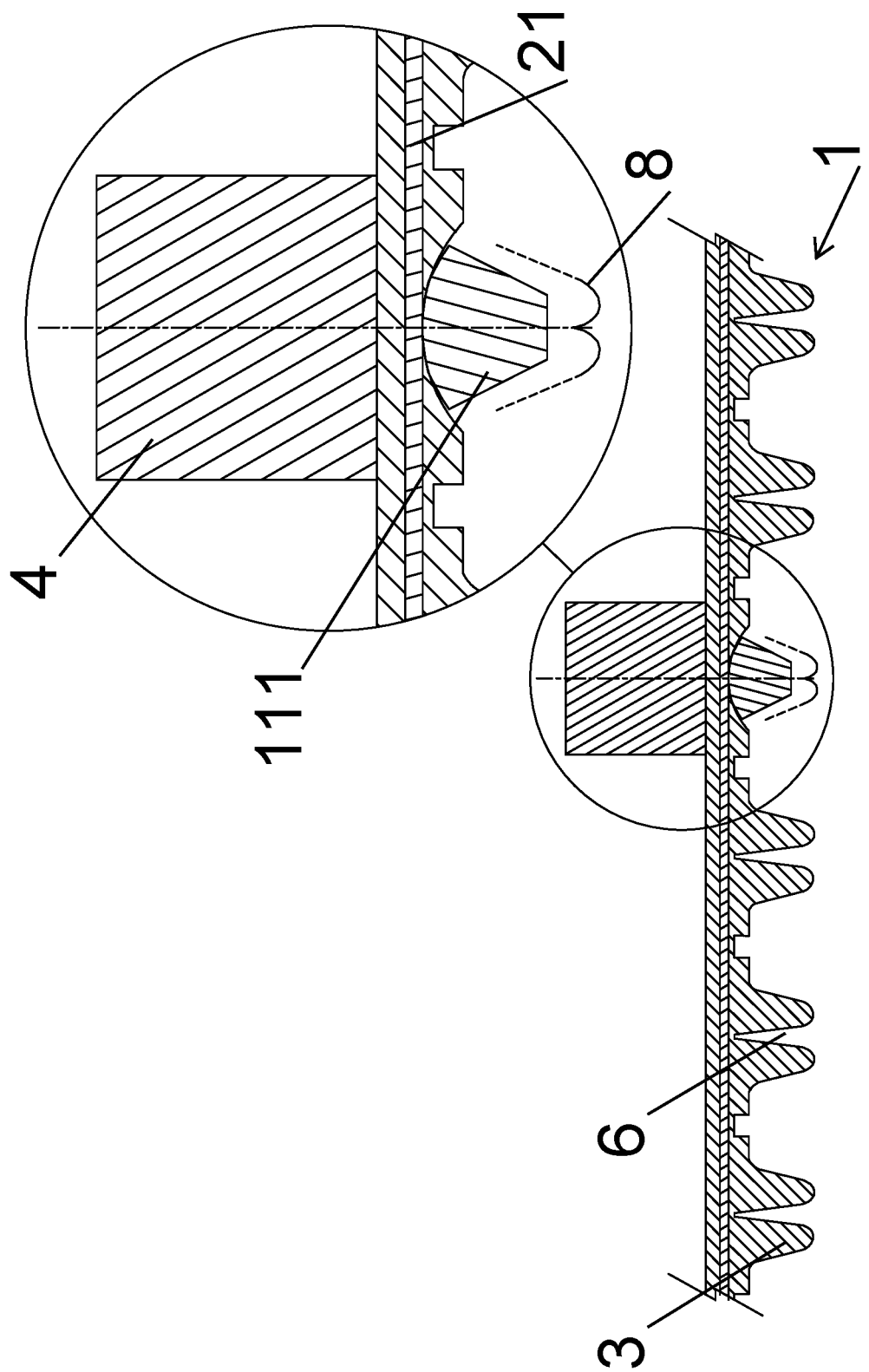
FIG. 12 is a section view, with a detail, of a second version of a toothed belt complete with the element and false tooth according to a second embodiment.
Figure 13:
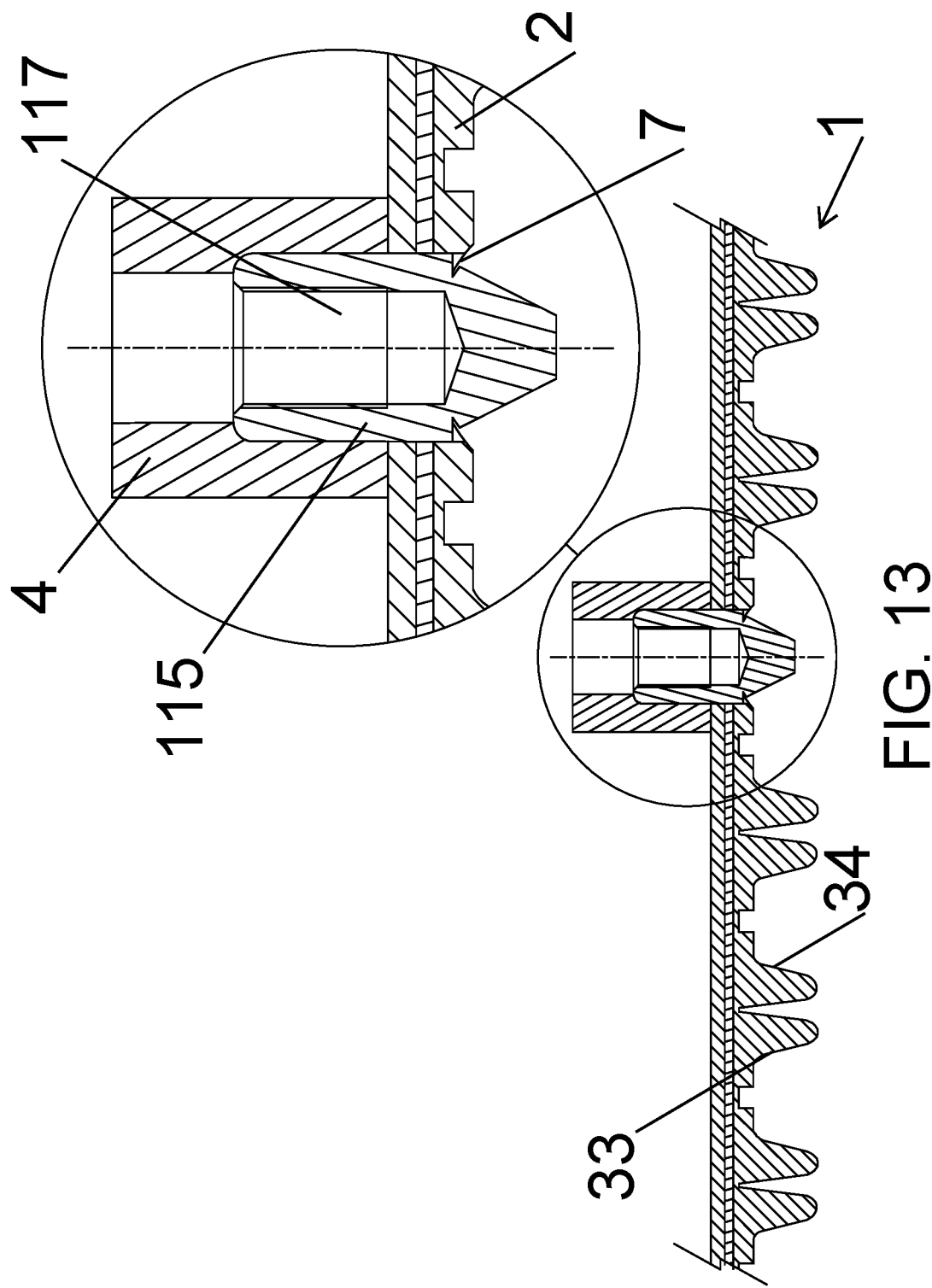
FIG. 13 is a section view, with a detail, of the toothed belt of FIG. 12 with a plane passing through the axis of the through-hole in the base of the toothed belt.
Figure 16:
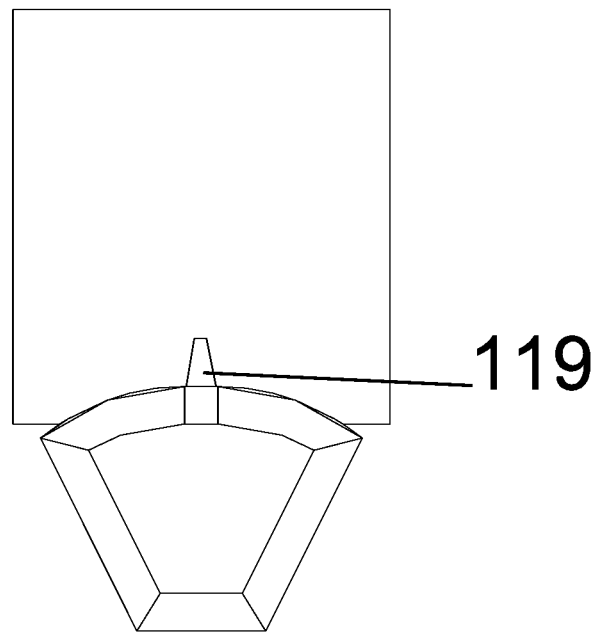
FIG. 16 is a lateral view of a semi-finished workpiece alike that of FIG. 14 but with a longitudinal relief.

The third flank (114) preferably comprises at least a longitudinal relief (119) in the most outer region, useful for limiting transversal displacements or rotations of the longitudinal bar (111) once in the seat. For example the longitudinal relief (119) visible in FIG. 16 can engage in the nose visible in FIG. 10, thus avoiding the rotation of the false tooth (100) and, in a case where the false tooth (100) comprises a plurality of bushings (115), thus reducing the tensions on the through-holes and limiting or preventing deformation thereof.

The third flank (114) is preferably arc-shaped, when seen in transversal section, thus preventing discontinuities which might stress the bearing layer (21) of the base (2).

The false tooth (10, 100) of the present invention, in both the first and the second embodiment, is advantageously used in a toothed belt (1) comprising a cogging (3) provided with grooves (6) which increase the flexibility of the toothed belt (1), especially during the winding.

The invention further relates to a toothed belt (1) for winding about a toothed pulley which comprises the base (2), a cogging (3), a plurality of grooves (6), an element (4) and a false tooth (10, 100) according to the first or the second embodiment.

The cogging (3) for winding a toothed pulley is on the base (2) and comprises a plurality of teeth. Each groove (6) of the plurality of grooves (6) is identical to the others and the plurality of grooves (6) comprises a groove (6) for each tooth of the plurality of teeth; each groove (6) of the plurality of grooves (6) preferably extends for the whole tooth.

The through-hole crosses the base (2) and the element (4) is on the base (2) on the opposite side to the side on which the cogging (3) is located, at the through-hole.

Each tooth of the plurality of teeth advantageously comprises a first wall (31) and a second wall (32), both the first wall (31) and the second wall (32) defining, on one side, a respective flank (33, 34) of the tooth and on the other side delimiting, at least partly, the respective groove (6) of the plurality of grooves (6).

Further, the bushing (15, 115) of the false tooth (10, 100) engages the through-hole and the false tooth (10, 100) is on the base (2) on the side on which the cogging (3) is on, and is connected to the element (4).

A toothed belt (1) made in this way can wind about pulleys without being subject to rapid damage to the bearing layer (21). This advantage pertains even when each groove (6) of the plurality of grooves (6) is deeper than the height of the tooth.

The toothed belt (1) preferably comprises a screw (5) for connecting the member (4) to the false tooth (10, 100) and most preferably the threading of the screw (5) engages the false tooth (10, 100) so that the head of the screw (5) is on the side of the base (2) where the element (4) is located. As is known, the screw (5) enables adjusting the element (4) with respect to the false tooth (10, 100) and, therefore, to the base (2) of the toothed belt (1).

The toothed belt (1) can comprise a plurality of through-holes to accommodate a same number of bushings (15, 115) of a same false tooth (10, 100) according to the first or the second embodiment.

The groove (6) can affect only the tooth or, should it have a greater height than the tooth, also the base (2); in this second case the first wall (31) and the second wall (32) of the tooth only partly delimit the groove (6) which is also delimited by the base (2) at the end.

When the toothed belt (1) comprises a false tooth (10) according to the first embodiment, the through-hole is at a first tooth (30) of the plurality of teeth, the longitudinal bar (11) engages the groove (6) of the first tooth (30) and, the first flank (12) and the second flank (13) preferably respectively contact the first wall (31) and the second wall (32) of the first tooth (30); in this way the first flank (12) and the second flank (13) work on the material of the tooth.

When the toothed belt (1) comprises a false tooth (100) according to the second embodiment, the through-hole is at an at least partly missing tooth of the cogging (3), the third flank (114) contacts the base (2) and/or the remaining portion of the at least partly missing tooth and, preferably, the first flank (112) and the second flank (113) are within the theoretical profile (8) of the at least partly-missing tooth, when it is compressed between the teeth of a toothed pulley.

As well as the advantages described in the foregoing, this last preferred version of the toothed belt (1) enables the winding of toothed pulleys, generally of small diameter, which require a reduction of the thickness of the tooth to enable the winding as the false tooth (100) does not interfere with the teeth of the pulley. For example a like toothed belt (1) with cogging (3) pitched at 10 millimetres can wind about a pulley with a diameter of less than 15 millimetres and around 10 millimetres.

In figures from 10 to 13 the tooth is completely missing and the layer beneath the seat (7) represents the nose (2) of the base of the toothed belt (1).

Notwithstanding the fact that the third flank (114) couples to the base (2) even on a flat seat (7), the mobility of the false tooth (100) is further limited should the seat (7) be conformed in an arc-shape, so as to match the third flank (114). In this version, illustrated in FIG. 10, increases the material placed between the longitudinal bar (111) and the bearing layer (21) given a same minimum distance between the seat (7) and the bearing layer (21). The material interposed limits the negative effects on the bearing layer (21) of the base (2) of the toothed belt (1), due to the rigidity of the false tooth (100) and can absorb part of the stresses, for example by deforming.

With the false tooth (10) according to the first embodiment an element (4) can be secured to the base (2) of a toothed belt (1) to wind about a toothed pulley, without any need for prior milling, with a method that comprises steps as follow:
  providing a toothed belt (1) comprising a base (2), a cogging (3) for winding a toothed pulley which is on the base (2) and which comprises a plurality of teeth, a plurality of grooves (6) that are identical to one another, a groove (6) for each tooth of the plurality of teeth, each tooth of the plurality of teeth comprising a first wall (31) and a second wall (32), both the first wall (31) and the second wall (32) defining, on one side, a respective flank (33, 34) of the tooth and on the other side delimiting, at least partly, the respective groove (6) of the plurality of grooves (6);
  providing a false tooth (10) according to the first embodiment;
  providing an element (4);
  realising at least a through-hole, piercing at least the base (2) in proximity of a first tooth (30) of the plurality of teeth;
  placing the false tooth (10) in the groove (6) of the plurality of grooves (6) of the first tooth (30) so that the bushing (15) engages the at least a through-hole, so that the longitudinal bar (11) engages the groove (6) and so that the first flank (12) and the second flank (13) respectively contact the first wall (31) and the second wall (32) of the first tooth (30);
  placing the element (4) on the base (2) on the opposite side to the side on which the cogging (3) is on, at the at least a through-hole;
  connecting the false tooth (10) to the element (4), for example by screwing a screw (5) into a threaded hole (17) of the false tooth (10) with the head of the screw (5) resting in a special seat (7) made on the element (4).

In both the first and the second embodiment, the false tooth (10, 100) can be produced from a modular semi-finished workpiece (9) which enables arranging the false teeth of different lengths as they derive from a single block constituted by a plurality of false teeth, preferably identical to one another, which can be cut according to need.

Figure 14:
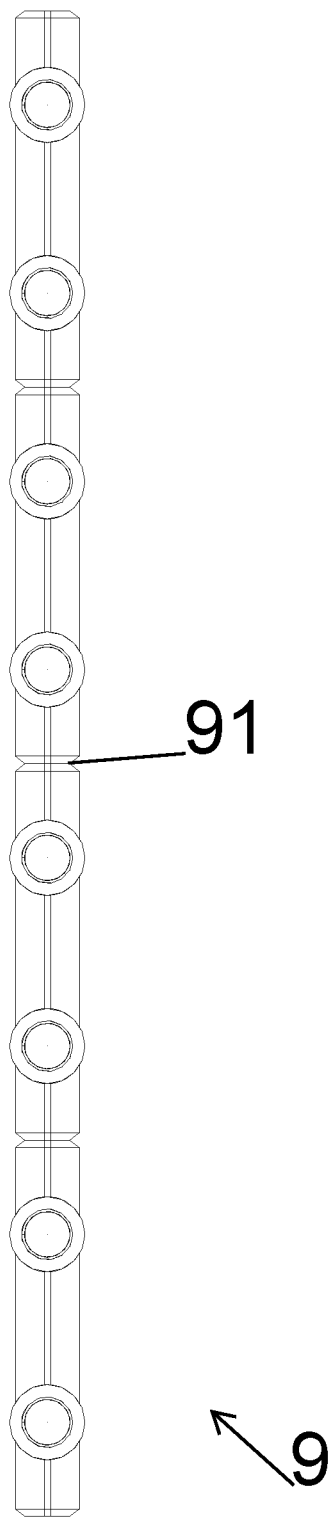
FIG. 14 is a view from above of a semi-finished workpiece.
Figure 15:
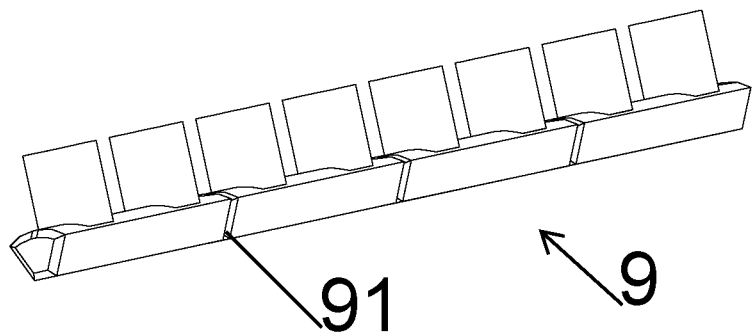
FIG. 15 is an axonometric view of the semi-finished workpiece of FIG. 14.

The semi-finished workpiece (9) comprises a plurality of false teeth according to the first or the second embodiment, as can be seen in FIG. 14. The false teeth of the plurality of false teeth are arranged in a row on a longitudinal axis and with the bushings extending from a same side of the semi-finished workpiece (9). The false teeth of the plurality of false teeth are joined to one another and the section of the longitudinal bar (11, 111) of at least one of the adjacent false teeth of the plurality of false teeth is reduced in proximity of the adjacent tooth so as to determine a cut (91) which facilitates the breakage of the semi-finished workpiece (9) between the two false teeth.

The section of the longitudinal bar (11, 111) of all the adjacent false teeth of the plurality of false teeth is preferably reduced in proximity of the adjacent tooth, further facilitating the breakage.

The bushings preferably extend parallel with one another; in the same direction, to insist on the same side. It is further preferable that they have a hole (17, 117) with an axis of symmetry parallel to the that of the other bushings so that false teeth comprising a plurality of modules have a like behaviour over the whole length thereof.

The surface of the longitudinal bars (11, 111) is preferably hardened to facilitate the breakage of the semi-finished workpiece (9). Much more preferably all the surface of the semi-finished workpiece (9) is subjected to hardening which, for example, can be obtained by anodic oxidation, especially in the case of false teeth made of aluminium. The same treatment can relate to single false teeth (10, 100) according to the invention.

In the appended figures the longitudinal bar (11, 111) touches the base (2) of the groove (6), though this characteristic is not strictly necessary; further, the cogging (3) is similarly founded on the base (2) so that the two elements can be produced in a same material, though they are two functionally-different elements.

The false teeth of the present invention are preferably configured to remain within the volume that the theoretical tooth of the cogging (3) would occupy, and are in general products made of a more rigid material than that of the toothed belt (1), for example steel or aluminium.

It is understood that the above has been described by way of non-limiting example and that any constructional variants are considered to fall within the protective scope of the present technical solution, as claimed in the following.

The invention claimed is:

1. A false tooth for toothed belts, such as belts or conveyor belts, comprising a through-hole, which crosses the base of the toothed belt, and a groove which is in communicating with the through-hole and which is at least partly delimited by a first wall and a second wall of a tooth, both the first wall and the second wall defining, on the opposite side to the side of the groove, a respective flank of the tooth, the false tooth comprising:
   a longitudinal bar which is conformed such as to engage a groove of a toothed belt and which comprises a first flank and a second flank, both the first flank and the second flank extending longitudinally on opposite sides of the longitudinal bar and being configured to contact respectively a first wall and a second wall which delimit the groove;
   a bushing which is solidly constrained to the longitudinal bar, which extends transversally from the first flank and the second flank and is configured to engage a through-hole communicating with the groove;
   wherein the longitudinal bar is tapered towards the free end of the bushing, the width of the longitudinal bar between the first flank and the second flank diminishing towards the free end of the bushing.

2. The false tooth of claim 1, wherein both the first flank and the second flank are configured to contact, with all of the surface thereof, with an exception of a respective longitudinal end region located towards the free end of the bushing when the height of the groove is greater than the height of the tooth.

3. The false tooth of claim 1, wherein the longitudinal bar is V-shaped or U-shaped, when seen in transversal section, and wherein the first flank and the second flank define a respective rod of the V or of the U.

4. The false tooth of claim 1, wherein the first flank and the second flank are symmetrical with respect to a median plane and the bushing is axial-symmetrical with respect to an axis lying on the median plane.

5. A false tooth per toothed belts comprising a through-hole, crossing the base of the toothed belt, the false tooth comprising:
   a longitudinal bar which comprises a first flank, a second flank and, between the first and second flanks, a third flank, both the first flank and the second flank extending longitudinally on opposite sides of the longitudinal bar and the third flank extending longitudinally and being configured to contact the toothed belt;
   a bushing which is solidly constrained to the longitudinal bar and which extends transversally from the third flank in order to engage a through-hole of the toothed belt;
   wherein the third flank is concave towards the first flank and the second flank, when seen in transversal section.

6. The false tooth of claim 5, wherein the third flank is arc-shaped, when seen in transversal section.

7. A toothed belt for winding about a toothed pulley comprising:
   a base;
   a cogging for winding a toothed pulley which is on the base and which comprises a plurality of teeth;
   a plurality of grooves, identical to one another, a groove for each tooth of the plurality of teeth;
   a through-hole, which crosses the base;
   an element which is on the base, on the opposite side to the side on which the cogging is on, at the through-hole;
   a false tooth according to claim 1;
   wherein each tooth of the plurality of teeth comprises a first wall and a second wall, both the first wall and the second wall defining, on one side, a respective flank of the tooth and on the other side delimiting, at least partly, the respective groove of the plurality of grooves;
   wherein the bushing of the false tooth engages the through-hole;
   wherein the false tooth is on the base on the side on which the cogging is on, and is connected to the element.

8. The toothed belt of claim 7, wherein each groove of the plurality of grooves is deeper than the height of the tooth.

9. The toothed belt of claim 7, wherein the through-hole is at a first tooth of the plurality of teeth, the longitudinal bar engages the groove of the first tooth and wherein the first flank and the second flank respectively contact the first wall and the second wall of the first tooth.

10. The toothed belt of claim 9, wherein the longitudinal bar touches the base of the groove.

11. The toothed belt of claim 7, wherein the through-hole is at an at least partly missing tooth of the cogging, wherein the third flank contacts the base and/or the remaining portion of the at least partly missing tooth wherein the first flank and the second flank are within the theoretical profile of the at least partly-missing tooth, when it is compressed between the teeth of a toothed pulley.

12. A method for securing an element to the base of a toothed belt to wind about a toothed pulley, the method comprising following steps:
  providing a toothed belt comprising a base, a cogging for winding a toothed pulley which is on the base and which comprises a plurality of teeth, a plurality of grooves that are identical to one another, a groove for each tooth of the plurality of teeth, each tooth of the plurality of teeth comprising a first wall and a second wall, both the first wall and the second wall defining, on one side, a respective flank of the tooth and on the other side delimiting, at least partly, the respective groove of the plurality of grooves;
  providing a false tooth according to claim 1;
  providing an element;
  realising at least a through-hole, piercing at least the base in proximity of a first tooth of the plurality of teeth;
  placing the false tooth in the groove of the plurality of grooves of the first tooth so that the bushing engages the at least a through-hole, so that the longitudinal bar engages the groove and so that the first flank and the second flank respectively contact the first wall and the second wall of the first tooth;
  placing the element on the base on the opposite side to the side on which the cogging is on, at the at least a through-hole;
  connecting the false tooth to the element.

13. A semi-finished workpiece which comprises a plurality of false teeth according to claim 1 wherein the false teeth of the plurality of false teeth are arranged in a row on a longitudinal axis and with the bushing extending from a same side of the semi-finished workpiece, wherein the adjacent false teeth of the plurality of false teeth are joined to one another and wherein the section of the longitudinal bar of at least one of the adjacent false teeth of the plurality of false teeth is reduced in proximity of the adjacent tooth.

14. The semi-finished workpiece of claim 13, wherein the surface of the longitudinal bars is surface-hardened.

15. A toothed belt for winding about a toothed pulley comprising:
  a base;
  a cogging for winding a toothed pulley which is on the base and which comprises a plurality of teeth;
  a plurality of grooves, identical to one another, a groove for each tooth of the plurality of teeth;
  a through-hole, which crosses the base;
  an element which is on the base, on the opposite side to the side on which the cogging is on, at the through-hole;
  a false tooth according to claim 5;
  wherein each tooth of the plurality of teeth comprises a first wall and a second wall, both the first wall and the second wall defining, on one side, a respective flank of the tooth and on the other side delimiting, at least partly, the respective groove of the plurality of grooves;
  wherein the bushing of the false tooth engages the through-hole;
  wherein the false tooth is on the base on the side on which the cogging is on, and is connected to the element.

16. The toothed belt of claim 15, wherein the through-hole is at an at least partly missing tooth of the cogging, wherein the third flank contacts the base and/or the remaining portion of the at least partly missing tooth wherein the first flank and the second flank are within the theoretical profile (8) of the at least partly-missing tooth, when it is compressed between the teeth of a toothed pulley.

17. The toothed belt of claim 16, wherein the third flank of the false tooth is arc-shaped, when seen in transversal section, and wherein the base has, at the tooth at least partly missing, an arc-shaped seat for matching the third flank.

18. A semi-finished workpiece which comprises a plurality of false teeth according to claim 5 wherein the false teeth of the plurality of false teeth are arranged in a row on a longitudinal axis and with the bushing extending from a same side of the semi-finished workpiece, wherein the adjacent false teeth of the plurality of false teeth are joined to one another and wherein the section of the longitudinal bar of at least one of the adjacent false teeth of the plurality of false teeth is reduced in proximity of the adjacent tooth.

\* \* \* \* \*